US008155860B2

(12) United States Patent
Franco et al.

(10) Patent No.: US 8,155,860 B2
(45) Date of Patent: Apr. 10, 2012

(54) REAL TIME DOSER EFFICIENCY MONITORING

(75) Inventors: Javier Franco, Columbus, IN (US);
Thomas A. Grana, Columbus, IN (US);
Daniel D. Wilhelm, Nashville, IN (US);
Xiao Lin, Zionsville, IN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 707 days.

(21) Appl. No.: 12/206,088

(22) Filed: Sep. 8, 2008

(65) Prior Publication Data

US 2009/0248361 A1 Oct. 1, 2009

Related U.S. Application Data

(63) Continuation-in-part of application No. 12/060,507, filed on Apr. 1, 2008.

(51) Int. Cl.
*F02D 41/00* (2006.01)

(52) U.S. Cl. ............... 701/103; 701/114; 73/114.69

(58) Field of Classification Search .......... 701/101–105, 701/112, 114, 115; 123/294–298, 478–480, 123/531, 533, 527; 60/274, 285–289, 295, 60/298; 73/114.69, 114.76, 700; 702/182
See application file for complete search history.

(56) References Cited

U.S. PATENT DOCUMENTS

| | | | | |
|---|---|---|---|---|
| 5,020,504 A | * | 6/1991 | Morikawa | 123/531 |
| 5,801,308 A | * | 9/1998 | Hara | 73/223 |
| 5,832,717 A | * | 11/1998 | Halin | 60/39.281 |
| 6,484,573 B2 | * | 11/2002 | Bundock et al. | 73/114.48 |
| 6,520,769 B2 | * | 2/2003 | Tachihara et al. | 431/170 |
| 6,901,953 B2 | * | 6/2005 | D'Agostino et al. | 137/512.1 |
| 7,080,550 B1 | * | 7/2006 | Goris et al. | 73/114.48 |
| 7,878,183 B2 | * | 2/2011 | Jaloszynski et al. | 123/533 |
| 2006/0278283 A1 | * | 12/2006 | Gouzou et al. | 137/571 |
| 2008/0010975 A1 | | 1/2008 | Zhang et al. | |
| 2008/0016853 A1 | | 1/2008 | Zhang et al. | |

FOREIGN PATENT DOCUMENTS

| | | |
|---|---|---|
| JP | 56-50211 A | 5/1981 |
| JP | 07-279648 A | 10/1995 |
| JP | 2000-297706 A | 10/2000 |

OTHER PUBLICATIONS

International Search Report of PCT/US2009/033529, dated Sep. 17, 2009.
Written Opinion of the International Searching Authority of PCT/US2009/033529, dated Sep. 17, 2009.
Co-pending U.S. Appl. No. 12/060,507, filed Apr. 1, 2008.

* cited by examiner

*Primary Examiner* — John Kwon
*Assistant Examiner* — Johnny Hoang
(74) *Attorney, Agent, or Firm* — Hamre, Schumann, Mueller & Larson, P.C.

(57) ABSTRACT

A real time, average pressure difference method for monitoring doser efficiency is described that determines the difference between the average pressure when the doser is not injecting and the average pressure when the doser is injecting at a predetermined commanded injection rate. The average pressure difference method results in improved doser efficiency monitoring. The method can be implemented in a number of areas. For example, in a diesel truck application, the doser efficiency can be monitored accurately in real time.

14 Claims, 9 Drawing Sheets

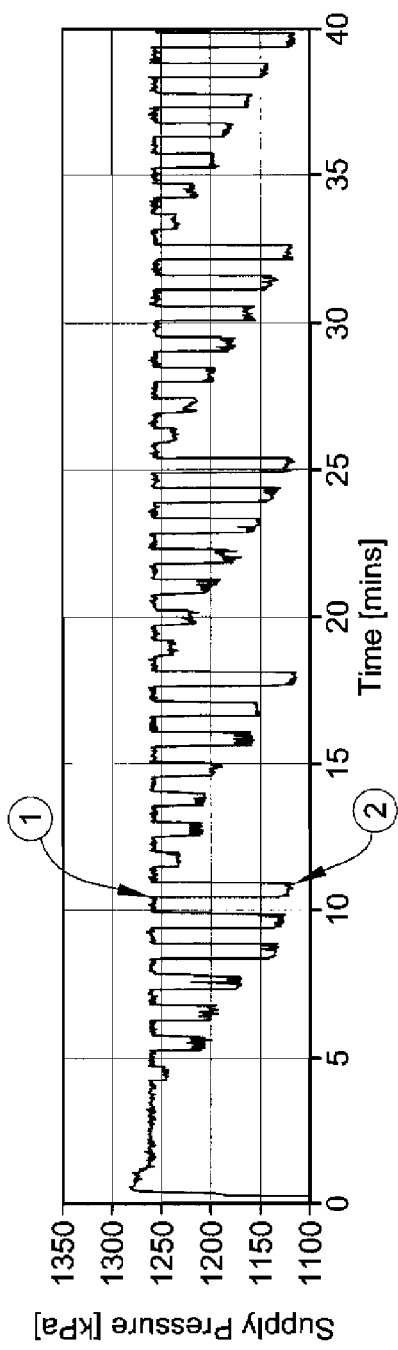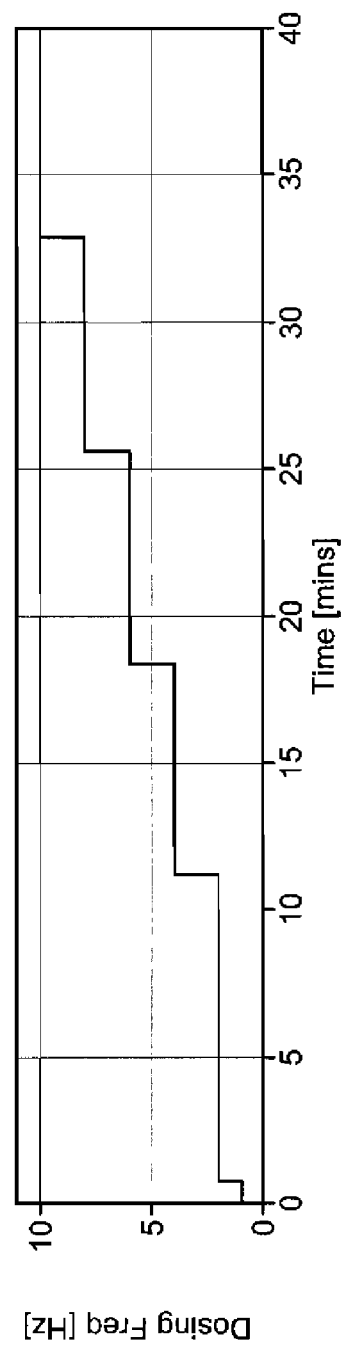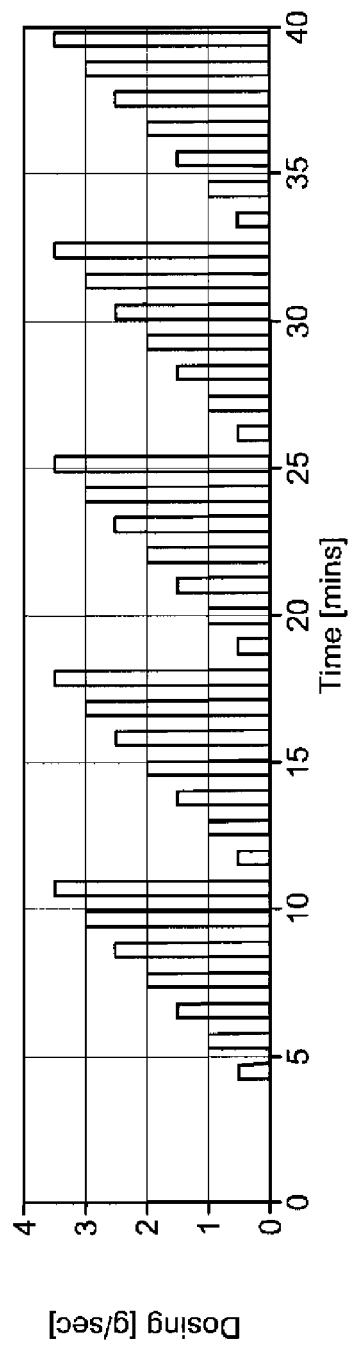
Fig. 9A
Fig. 9B
Fig. 9C

REAL TIME DOSER EFFICIENCY MONITORING

This application is a continuation-in-part application of pending application Ser. No. 12/060,507, filed on Apr. 1, 2008, entitled REAL TIME DOSER EFFICIENCY MONITORING, the entire contents of which are incorporated herein by reference.

FIELD

This disclosure relates to an exhaust gas aftertreatment system and a doser system used with the aftertreatment system to inject a dosing agent into exhaust gas in the aftertreatment system.

BACKGROUND

The use of an aftertreatment system to treat exhaust gas before the exhaust gas is exhausted to atmosphere is known. One known aftertreatment system uses a diesel oxidation catalyst (DOC) device that is intended to react with the exhaust gas to convert nitric oxide to nitrogen dioxide. In the case of diesel exhaust, a diesel particulate filter (DPF) can also be provided downstream of the DOC to physically remove soot or particulate matter from the exhaust flow.

When exhaust gas temperatures are sufficiently high, soot is continually removed from the DPF by oxidation of the soot. When the exhaust gas temperature is not sufficiently high, active regeneration is used. In the case of diesel engine exhaust, one form of active regeneration occurs by injecting fuel into the exhaust gas upstream of the DOC. The resulting chemical reaction between the fuel and the DOC raises the exhaust gas temperature high enough to oxidize the soot in the DPF.

A doser system that includes a doser injector is used to inject the fuel into the exhaust gas. Deterioration of the doser injector can occur over its lifetime, for example due to doser tip carboning or a reduction of doser stroke. Doser deterioration is believed to be one of the most frequent modes of failure in aftertreatment systems. A known doser monitoring method that attempts to determine the efficiency of the doser injector senses the temperature difference across the DOC. However, the effectiveness of this method is decreased by deterioration of the DOC which cannot be independently monitored.

SUMMARY

Improved real time doser efficiency monitoring methods are described that can be used to monitor the efficiency of doser systems. The disclosed methods can be implemented in a number of areas. For example, in a diesel truck application, the doser efficiency can be monitored all the time, no matter whether the truck is in a transient or steady state.

In one disclosed embodiment, which will be referred to herein as the average pressure difference method, the efficiency of a doser injector that is configured and arranged to inject a fluid, such as a dosing agent, into exhaust gas is monitored by determining an average pressure of the fluid when the doser injector is not injecting, and determining an average pressure of the fluid when the doser injector is injecting at a predetermined commanded injection rate. The difference between the average pressure when the doser injector is not injecting and the average pressure when the doser injector is injecting is then determined. Thereafter, the determined pressure difference is compared against a predetermined expected pressure difference. The average pressure when injecting can be determined at a suitable dosing frequency, for example 10 Hz.

The fluid that is injected can be a suitable dosing agent including, but not limited to, hydrocarbon fuels such as diesel fuel, alcohols, urea, ammonia, natural gas, and other agents suitable for use in aftertreatment of exhaust gases. However, the inventive concepts of the average pressure difference method are not limited to these types of dosing agents. The average pressure difference method is also useful when air is the injected working fluid.

In another disclosed embodiment, which will be referred to herein as the average instant pressure difference method, a doser efficiency monitoring method is described that determines the average instant pressure difference, defined as the average pressure while the doser is off minus the average pressure while the doser is on, within one duty cycle of the doser injector. In this method, the efficiency can be monitored by determining the average instant pressure difference of the dosing agent across an orifice, such as within a shut-off valve assembly, within a duty cycle of the doser injector. The doser injector is preferably pulse-width modulation controlled.

The average instant pressure difference is the maximum pressure drop so it has a better signal-to-noise ratio compared to the average pressure difference method, and is independent of the dosing command. The average instant pressure difference method is also more accurate, for example within 5% error.

The real time doser efficiency monitoring methods can be implemented by a doser system that comprises a doser injector that is configured and arranged to inject a dosing agent into exhaust gas, a dosing agent supply line connected to the doser injector, and a dosing agent shut-off valve assembly connected to the supply line that is configured and arranged to control the flow of the dosing agent in the supply line and to the doser injector. The valve assembly includes a pressure sensor for detecting dosing agent pressure in the valve assembly. A controller can be used to monitor the efficiency of the doser injector.

The disclosed methods can complete monitoring within fraction of seconds, which works well even during transient engine operations and dosing. The disclosed methods also have increased accuracy compared to prior methods. The disclosed methods are also independent of the performance, e.g. degradation, of individual aftertreatment components as is the current temperature based efficiency monitoring method.

The disclosed methods permit compliance with the on-board diagnostics requirement for the year 2010, which requires independent monitoring for each aftertreatment component. In addition, the higher efficiency achieved by the disclosed methods reduces the injection of excess fuel, called hydrocarbon slip, thereby avoiding violation of hydrocarbon emission regulations. Further, the occurrence of false detected "bad" dosers is reduced, thereby reducing warranty costs of doser replacement.

DESCRIPTION OF THE DRAWINGS

FIGS. 9A-C are graphs relating to the average pressure difference method of monitoring doser efficiency.

DETAILED DESCRIPTION

Figure 1:
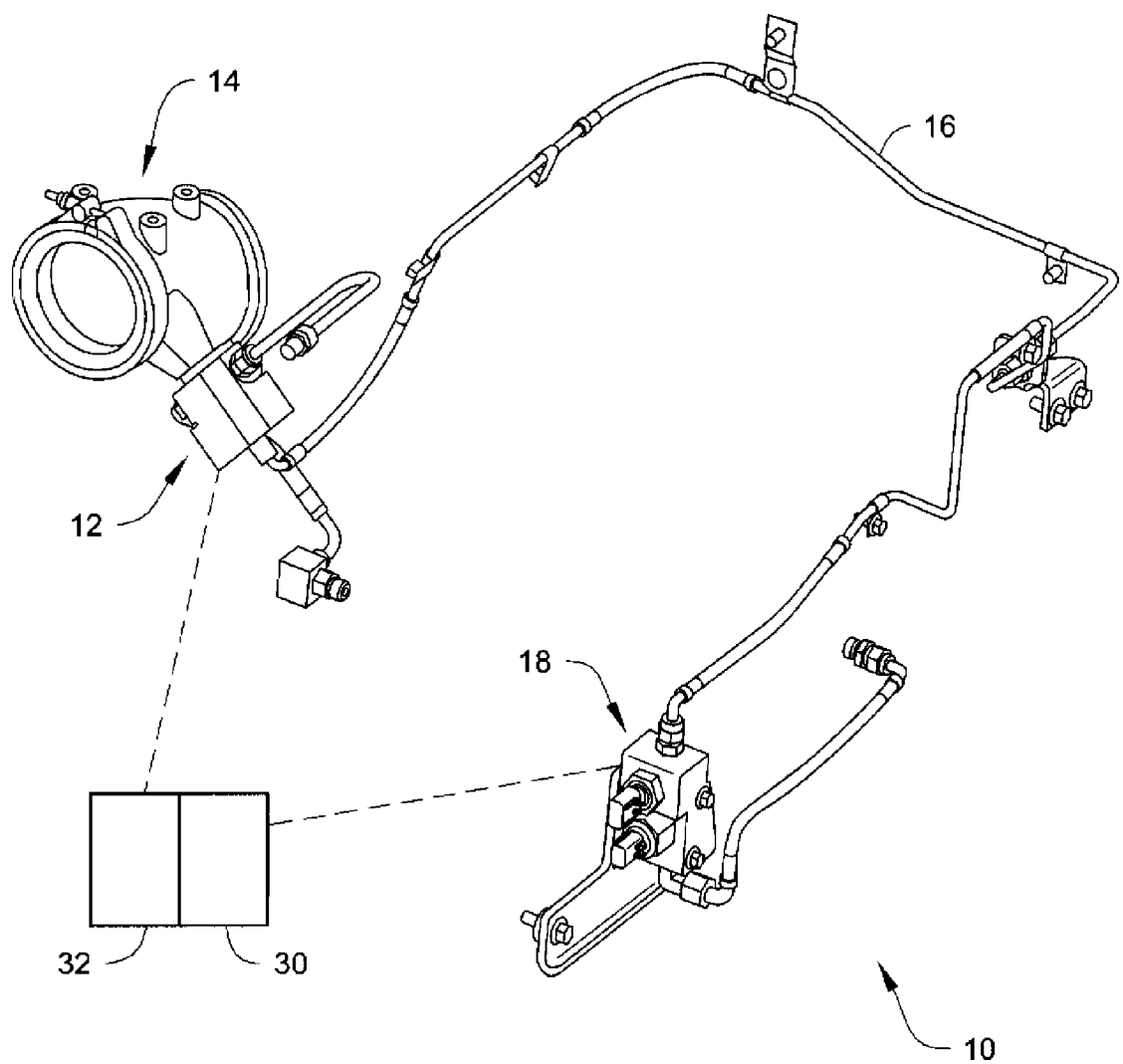
FIG. 1 illustrates an exemplary doser system that can implement the real time doser efficiency monitoring methods described herein.

With reference to FIG. 1, a doser system 10 for an exhaust gas aftertreatment system is illustrated. For sake of convenience in describing the unique concepts, this description will describe the doser system 10 as being a hydrocarbon doser system for a diesel fuel engine that injects diesel fuel into exhaust gas from the engine. However, it is to be realized that the unique concepts described herein can be applied to other doser systems that inject other types of dosing agents.

The basic configuration and operation of the doser system 10 and aftertreatment system are well known to persons of ordinary skill in the art. The doser system 10 includes a doser injector 12 that is connected to an exhaust gas connection tube 14 connected to the exhaust from an engine (not illustrated). As part of the aftertreatment system, exhaust gases in the connection tube 14 flow to a diesel oxidation catalyst (DOC) device that is intended to react with the exhaust gas to convert nitric oxide to nitrogen dioxide. A diesel particulate filter (DPF) is provided downstream of the DOC to remove soot or particulate matter from the exhaust flow.

The doser injector 12 is configured and arranged to inject a dosing agent, which in this exemplary embodiment is diesel fuel, into the exhaust gas in the tube 14 to increase the temperature of the DOC. The fuel is supplied via a fuel supply line 16. A shut-off valve assembly 18 is connected to the supply line 16 and is configured and arranged to control the flow of fuel in the supply line 16 and to the doser injector 12.

Figure 2:
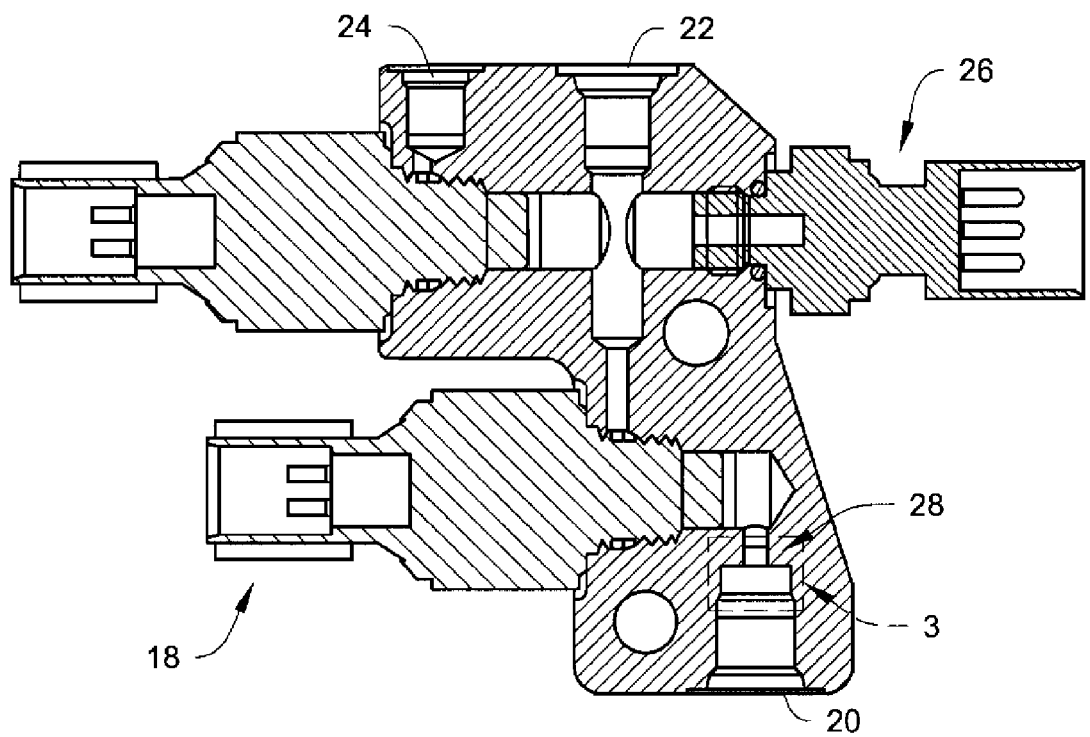
FIG. 2 illustrates the shut-off valve assembly of the system in FIG. 1.
Figure 3:
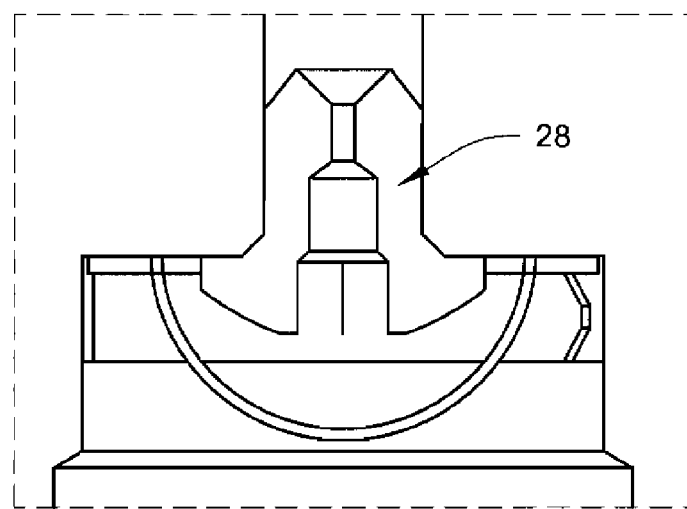
FIG. 3 is a detailed view of the portion in box 3 of FIG. 2 illustrating the trim orifice in the shut-off valve assembly.

Details of the shut-off valve assembly 18 are illustrated in FIGS. 2 and 3. The assembly 18 includes a fuel inlet port 20, a fuel outlet port 22 connected to the supply line 16, and a drain port 24. A pressure sensor 26 connected to the valve assembly 18 senses fuel pressure in the assembly 18. A trim orifice 28 is provided to keep the fuel pressure in the assembly 18 more stable. The construction and operation of the valve assembly 18 illustrated in FIGS. 2 and 3 are conventional.

Returning to FIG. 1, a controller 30 is connected to the pressure sensor 26 and receives pressure readings therefrom. The controller 30 monitors the efficiency of the doser injector 12 by, in one embodiment, determining the average instant pressure difference of the fuel at the shut-off valve assembly 18 within one duty cycle of the doser injector which is pulse-width modulation (PWM) controlled. The controller 30, which can be an electronic control module (ECM), can also control the aftertreatment system. The doser injector 12 is controlled by a separate PWM controller 32.

Figure 4:
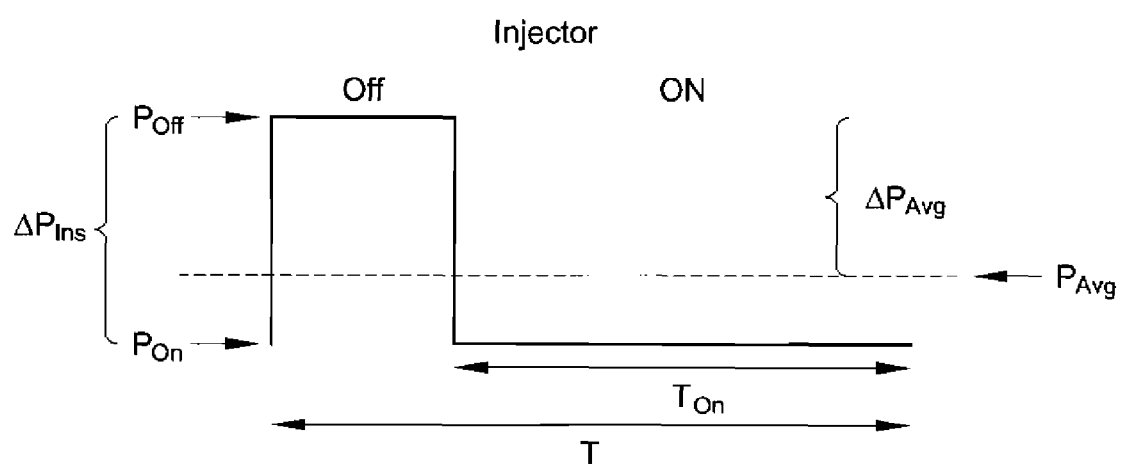
FIG. 4 depicts a pressure reading for use with the average instant pressure difference method over one cycle period of the doser injector.
Figure 5:
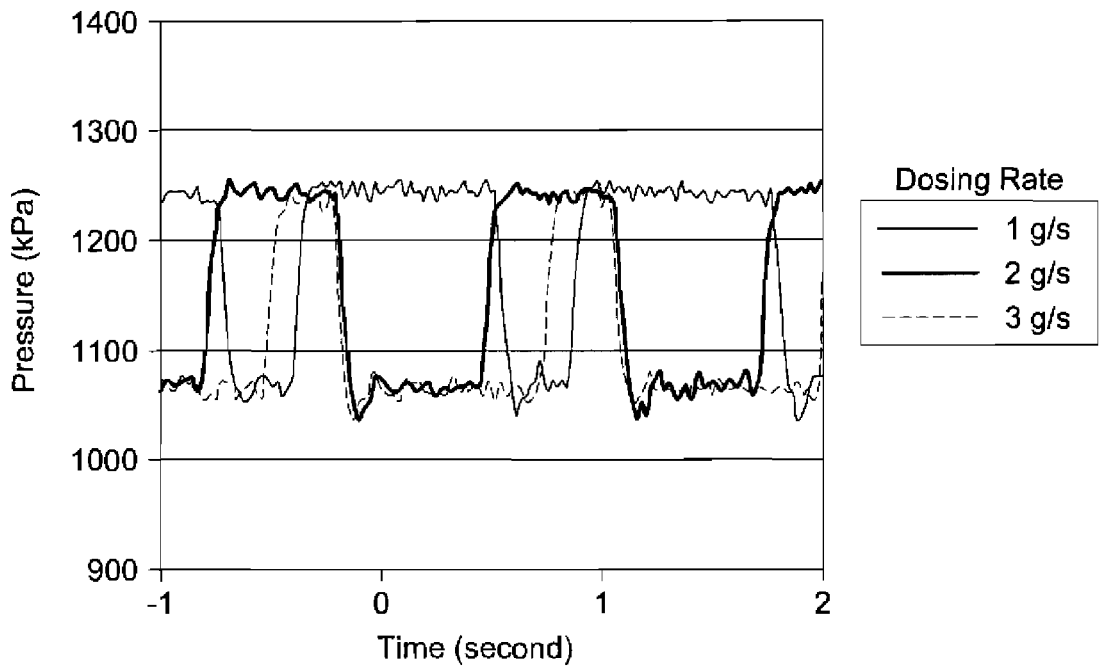
FIG. 5 is a graph of the dosing agent pressure versus time at different dosing rates for use with the average instant pressure difference method.
Figure 6:
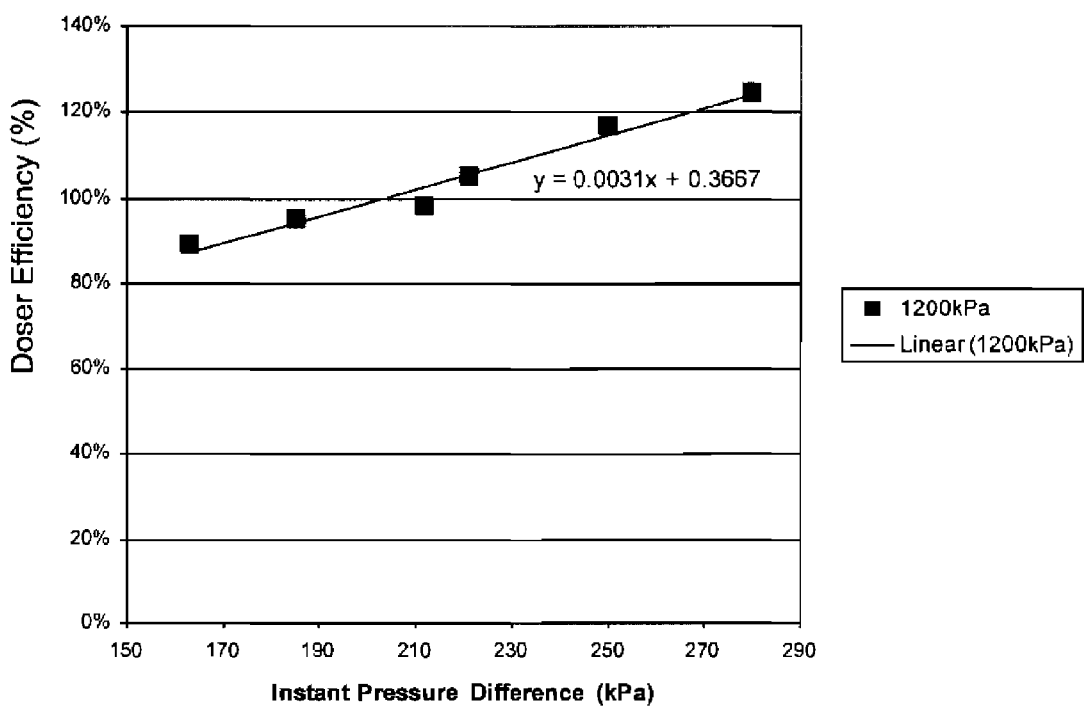
FIG. 6 is a graph of the doser efficiency versus instant pressure difference for 6 doser injectors with differing deterioration levels for use with the average instant pressure difference method.
Figure 7:
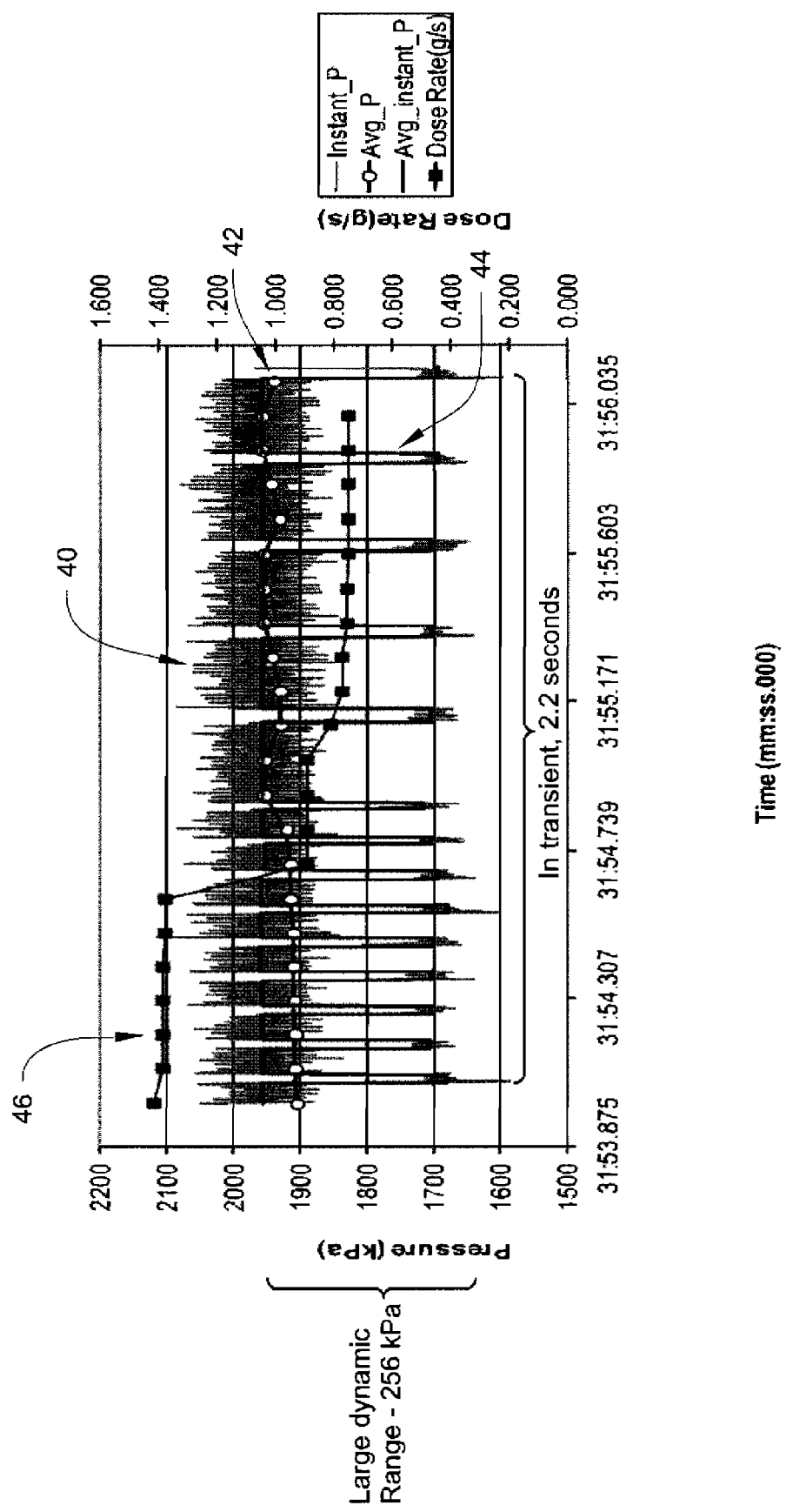
FIG. 7 is a graph of dosing agent pressure and dosing rate versus time.

The average instant pressure difference method for monitoring doser efficiency will now be described with respect to FIGS. 4-7, together with FIGS. 1-3. The fuel dosing rate is controlled by the duty cycle of the PWM controller. FIG. 4 shows one cycle period T of doser pressure, with $P_{off}$ and $P_{on}$ being the fuel pressure measured by the pressure sensor 26 when the doser injector is turned off and on, respectively. All references to pressure herein and the pressures shown in FIGS. 5-7 are the fuel pressure measured by the pressure sensor 26 in the valve assembly 18. $P_{avg}$ is the average pressure when the doser injects fuel at that duty cycle, calculated as follows:

$$P_{avg} = \frac{P_{on} \cdot T_{on} + P_{off} \cdot (T - T_{on})}{T} \qquad (Eq.\ 1)$$
$$= P_{on} \cdot R_{DC} + P_{off} \cdot (1 - R_{DC})$$

where $$R_{DC} = \frac{T_{on}}{T}$$

Ratio of duty cycle

The average pressure difference, $\Delta P_{avg}$, can be calculated as follows:

$$\Delta P_{avg} = P_{off} - P_{avg} \qquad (Eq.\ 2)$$
$$= P_{off} - P_{on} \cdot R_{DC} - P_{off} \cdot (1 - R_{DC})$$
$$= (P_{off} - P_{on}) \cdot R_{DC}$$
$$= \Delta P_{ins} \cdot R_{DC}$$

The average instant pressure difference, $\Delta P_{ins}$, is the average pressure difference by a factor of duty cycle. The average instant pressure difference is substantially independent of dosing rate. This is evident from FIG. 5 which depicts a graph of dosing agent pressure versus time at different dosing rates. From FIG. 5, it can be seen that the pressure difference (i.e. the difference between the maximum pressure $P_{off}$ and the minimum pressure $P_{on}$) remains substantially constant even with dosing rate changes.

FIG. 6 is a graph of the doser efficiency versus average instant pressure difference for 6 doser injectors with differing deterioration levels. From this graph, it can be determined that under the conditions set forth (e.g. at a supply pressure of about 1200 kPa) in the graph, a 10 kPa variation in instant pressure difference means approximately a 3.1% doser efficiency error.

FIG. 7 is a graph depicting various pressure measurements when the fuel dose rate changes from about 1.4 g/s to about 0.8 g/s within 2.2 seconds at a supply pressure of about 1950 kPa. The graph plots the individual instant pressure readings 40 versus time, the average pressure 42 versus time, the average instant pressure 44 versus time, and the dose rate 46 versus time.

Figure 8:
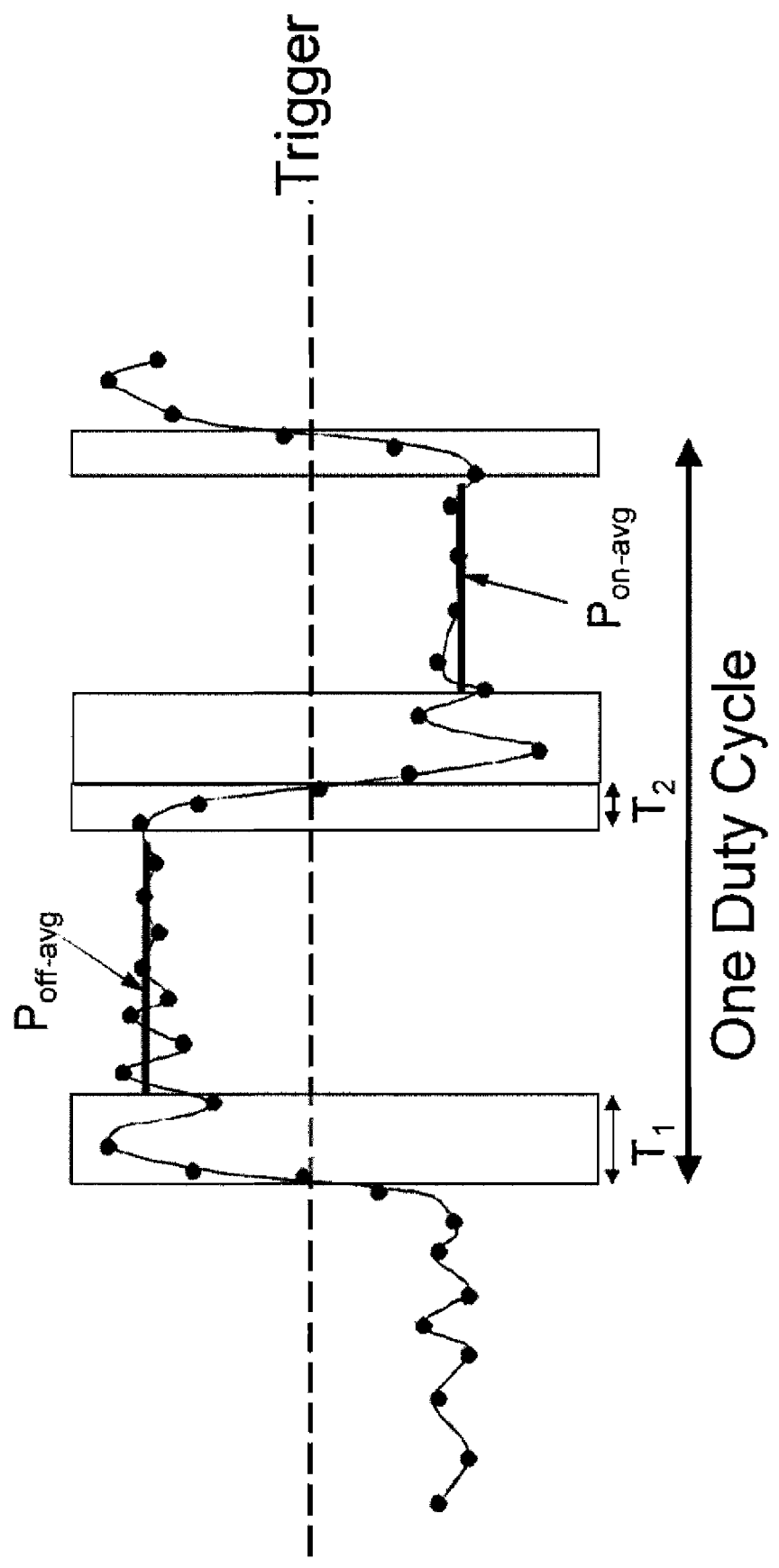
FIG. 8 depicts the average instant pressure difference method over one cycle period of the doser injector.

FIG. 8 depicts the average instant pressure difference method, where the average pressure while the doser is off and the average pressure while the doser is on over one duty cycle are illustrated. $T_1$ is the initial delay time to avoid signal overshoot, while $T_2$ is the buffer time to avoid falling edge data.

In the average instant pressure difference method described herein, relying upon the average instant pressure difference within a single duty cycle eliminates duty cycle error. In addition, the average instant pressure difference method relies upon a relatively large range of instant pressure difference, shown in FIG. 7 as about 256 kPa, over the single duty cycle. This helps to minimize the impact of pressure variations on the doser efficiency. From FIG. 7, the average instant pressure 44 while the doser is off holds relatively steady at about 1950 kPa, which is the assumed supply pressure. The variation in instant pressure difference while the doser injector is on varies by about 10 kPa. Assuming that the doser used in FIG. 7 is a 100% efficient doser, and assuming that a 100% efficiency doser at 1950 kPa supply pressure has an instant pressure difference of 256 kPa, then the doser efficiency error can be determined by taking the variation in instant pressure difference, 10 kPa, and dividing it by the pressure difference range of 256 kPa. The doser efficiency error for the average instant pressure difference method is thus about 3.9%.

The average pressure difference method of monitoring doser efficiency is illustrated in FIGS. 9A-C, 10 and 11, along with FIG. 7. This method compares the actual pressure drop with an expected pressure drop at a predetermined dosing command date. The pressure drop is the difference between the average pressure when the doser injector is not injecting and the average pressure when the doser injector is injecting at the predetermined commanded dosing rate.

With reference to FIGS. 9A-C, the supply pressure, dosing frequency and dosing rate, respectively, are plotted against time. Pressure drop is defined as the difference between the average pressure when the doser is not dosing or injecting, for example at point 1, and the average pressure when the doser is dosing or injecting at a predetermined commanded dosing rate, for example point 2. This is represented by the following equation:

$$\Delta P = P_1 - P_2 \quad \text{(Eq. 3)}$$

@$D_{max}$ maximum dosing rate

The pressure readings can be taken at any location(s) one finds suitable for obtaining accurate pressure readings. For example, the pressure while the doser is not dosing and the dosing rate equals zero can be measured upstream of the valve assembly 18 in FIG. 1 in a fuel filter manifold, while the pressure when the doser is dosing at a predetermined commanded dosing rate can be measured at the valve assembly 18 with the pressure sensor 26. The average pressure when the doser is dosing is then calculated based on the dosing frequency. The pressure drop is preferably determined at the highest dosing rate, which provides the highest resolution and thus better accuracy.

In the example illustrated in FIGS. 9A-C, $P_1$ is about 1260 kPa and $P_2$ is about 1125 kPa, so that $\Delta P$ is about 135 kPa at a commanded dosing rate of 3.5 g/sec and a dosing frequency of 2.5 Hz.

Figure 10:
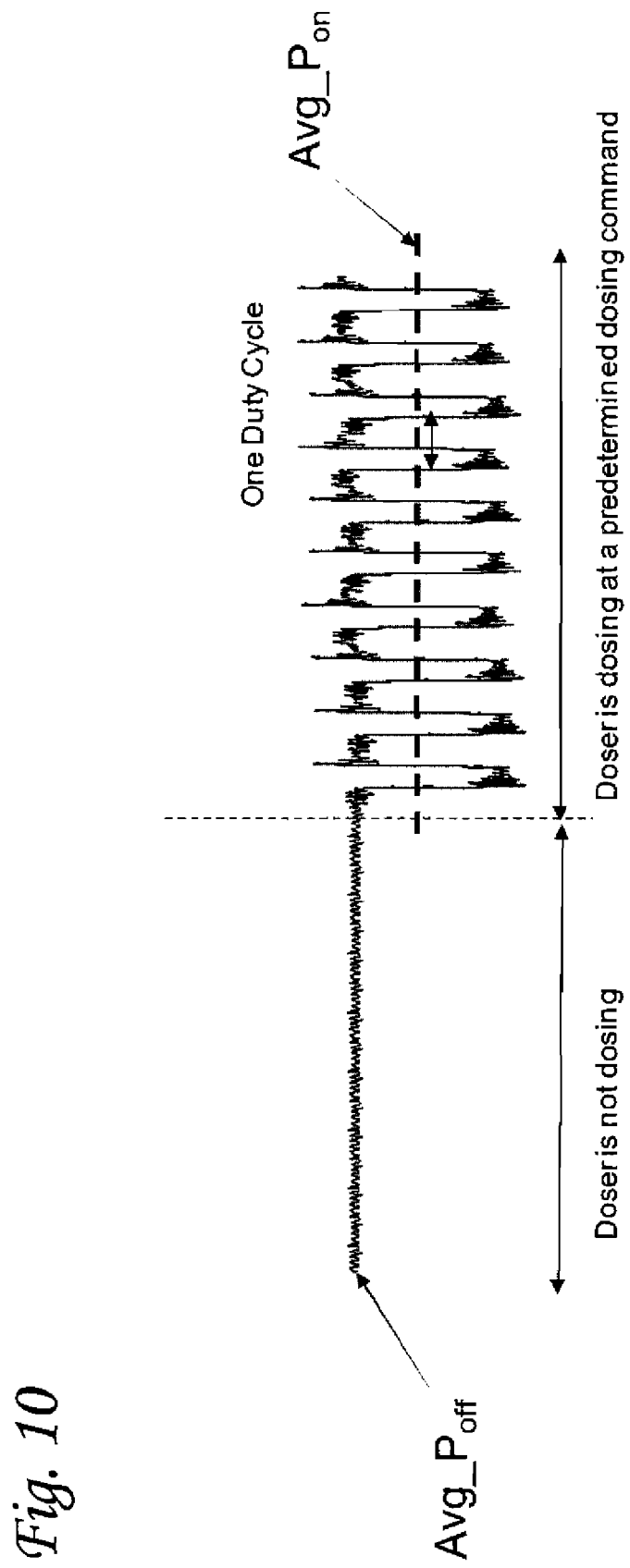
FIG. 10 depicts the average pressure difference method.

FIG. 10 depicts the average pressure difference method, where the average pressure while the doser is not dosing and the average pressure while the pressure is dosing at the predetermined dosing rate are shown.

Figure 11:
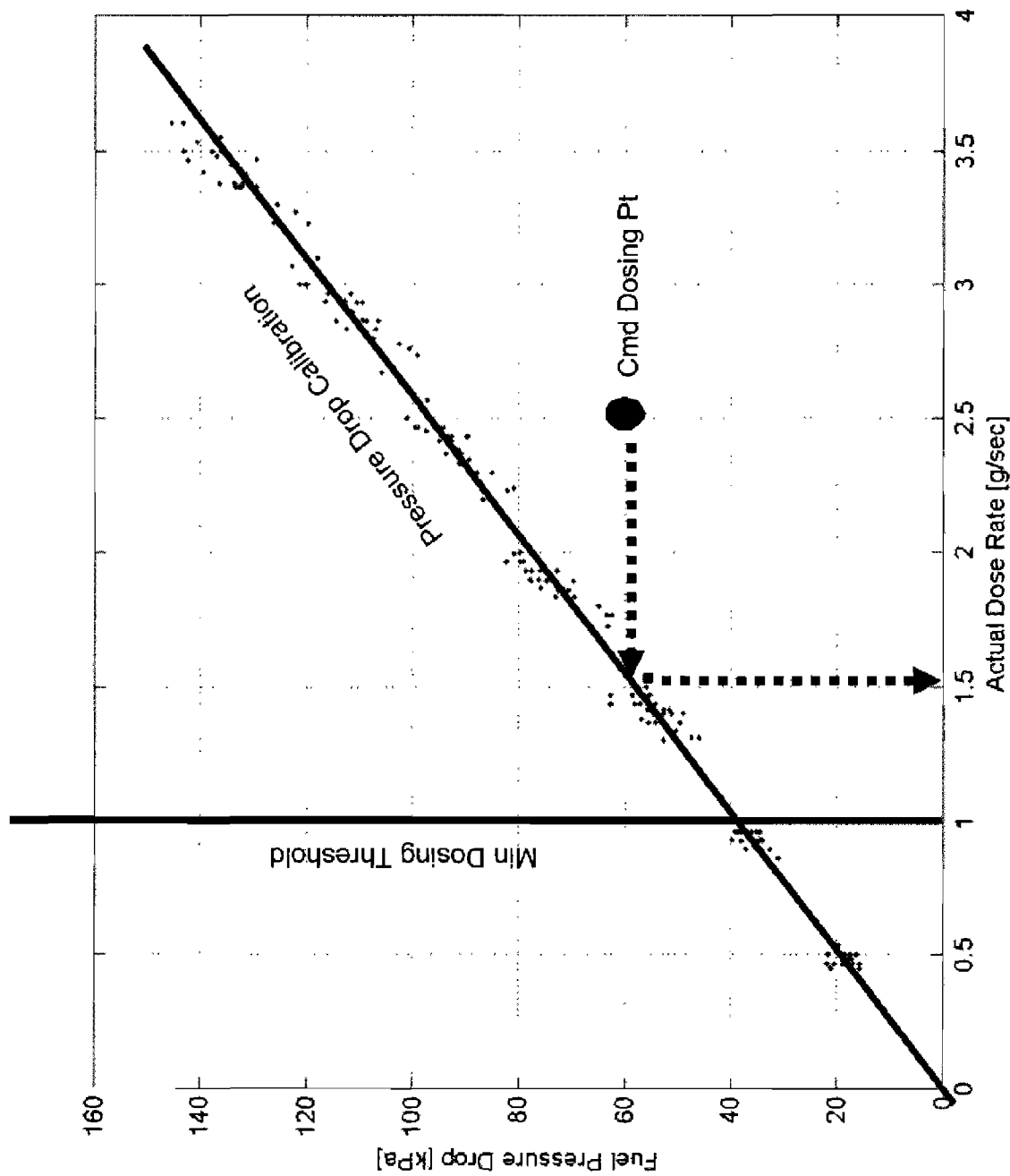
FIG. 11 is a graph of expected pressure drop versus dosing rate for use with the average pressure difference method encompassed in FIGS. 9A-C.

FIG. 11 is a graph that plots expected fuel pressure drop versus actual dosing rate. It has been found that the pressure drop versus dosing rate variability decreases as dosing frequency increases. Therefore, the graph in FIG. 11 is taken at a dosing frequency of, for example, 10 Hz. In this graph, a pressure drop calibration curve is depicted which represents the average readings of a number of different dosers.

An exemplary implementation of the pressure drop method will now be described with respect to FIG. 11. In this example, assume that the commanded dosing rate is 2.5 g/sec and assume that at this commanded dosing rate the calculated pressure drop determined using equation 3 is determined to be about 60 kPa. However, based on the pressure drop calibration curve, the expected pressure drop should have been about 98 kPa. Based on the determined pressure drop of about 60 kPa, the actual dosing rate is about 1.5 g/sec. Based on these readings, the deterioration percentage of the doser can be calculated as follows:

$$\text{Deterioration } [\%] = 100 \cdot \left(1 - \frac{2.5 - 1.5}{1.5}\right)$$
$$= 33$$

The results of the deterioration percentage calculation can be used in a number of ways. For example, if the percentage is high enough, a suitable message can be provided, such as lighting a warning lamp or providing a message on a visual display device, to notify a user of deterioration of the doser for monitoring purposes or possible replacement of the doser. Alternatively, the doser control can be adjusted by the deterioration amount to account for the deterioration so that the correct dosing rate is achieved.

In the average pressure difference method, the dynamic range of the average pressure difference is the dynamic range of the average pressure difference multiplied by a factor of duty cycle. Compare this with the average instant pressure difference method which relies upon the average instant pressure difference within a single duty cycle.

Although the monitoring methods herein have been described with respect to diesel fuel as the dosing agent, the concepts described herein can be applied to other dosing agents. For example, the dosing agent can be one or more of other types of fuels including hydrocarbon fuels, or other dosing agents such as alcohols, urea, ammonia, and natural gas. In addition, the concepts of the average pressure difference method can be applied when air is the working fluid, where the air is injected by the doser injector into the exhaust gas stream such as when air is used to clear the doser injector of residual dosing agent. Therefore, the terms "dosing", "doser" and the like are intended to encompass injection of dosing agents as well as injection of air.

The monitoring methods described herein can be implemented in a number of different ways. For example, the monitoring methods can be implemented by software residing in an aftertreatment system controller, for example in the controller 30. Alternatively, the disclosed monitoring methods can be implemented by hardware such as electronic circuitry at or near the pressure sensor 26.

The concepts described herein may be embodied in other forms without departing from its spirit or characteristics. The described embodiments are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of monitoring efficiency of a doser injector that is configured and arranged to inject a fluid into exhaust gas, comprising:

determining an average pressure difference of the fluid at a predetermined commanded injection rate of the doser injector, wherein determining the average pressure difference of the fluid includes using a pressure sensor to measure the pressure of the fluid when the doser injector is not injecting and to measure the pressure of the fluid when the doser injector is injecting at the predetermined commanded injection rate; and using the determined average pressure difference of the fluid to determine a deterioration percentage of the doser injector.

2. The method of claim 1, wherein determining the average pressure difference includes determining the average pressure of the fluid when the doser injector is not injecting, determining the average pressure of the fluid when the doser injector is injecting at the predetermined commanded injection rate, and determining the difference between the average pressure of the fluid when the doser injector is not injecting and the average pressure of the fluid when the doser injector is injecting.

3. The method of claim 1, wherein the method is implemented by software in a controller.

4. The method of claim 1, wherein the fluid is hydrocarbon fuel, air, alcohol, urea, ammonia, or natural gas.

5. The method of claim 1, wherein the predetermined commanded injection rate is the maximum commanded injection rate.

6. The method of claim 2, wherein determining the average pressure when the doser injector is injecting comprises determining the average pressure at an injection frequency of about 10 Hz.

7. The method of claim 1, wherein the exhaust gas is exhaust gas from a vehicle engine, and the doser injector is connected to an exhaust gas aftertreatment system that includes a diesel oxidation catalyst.

8. A method of monitoring efficiency of a doser injector that is configured and arranged to inject a fluid into exhaust gas, comprising:

determining an average pressure of the fluid when the doser injector is not injecting, and determining an average pressure of the fluid when the doser injector is injecting at a predetermined commanded injection rate, wherein determining the average pressures of the fluid includes using a pressure sensor to measure the pressure of the fluid when the doser injector is not injecting and to measure the pressure of the fluid when the doser injector is injecting at the predetermined commanded injection rate;

determining the difference between the average pressure of the fluid when the doser injector is not injecting and the average pressure of the fluid when the doser injector is injecting; and comparing the determined pressure difference against a predetermined expected pressure difference.

9. The method of claim 8, wherein the predetermined commanded injection rate is the maximum commanded injection rate.

10. The method of claim 8, wherein the fluid is hydrocarbon fuel, air, alcohol, urea, ammonia, or natural gas.

11. The method of claim 8, wherein determining the average pressure when the doser injector is injecting comprises determining the average pressure at an injection frequency of about 10 Hz.

12. The method of claim 8, wherein the exhaust gas is exhaust gas from a vehicle engine, and the doser injector is connected to an exhaust gas aftertreatment system that includes a diesel oxidation catalyst.

13. The method of claim 8, wherein the method is implemented by software in a controller.

14. The method of claim 8, comprising using the determined difference to determine a deterioration percentage of the doser injector.

* * * * *